United States Patent
Takeda et al.

(10) Patent No.: US 7,619,998 B2
(45) Date of Patent: Nov. 17, 2009

(54) MULTI-HOP COMMUNICATION SYSTEM, RADIO CONTROL STATION, RADIO STATION AND MULTI-HOP COMMUNICATION METHOD

(75) Inventors: Shinji Takeda, Yokohama (JP); Atsushi Fujiwara, Yokohama (JP); Hitoshi Yoshino, Yokosuka (JP); Toru Otsu, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/782,929

(22) Filed: Feb. 23, 2004

(65) Prior Publication Data

US 2004/0166853 A1 Aug. 26, 2004

(30) Foreign Application Priority Data

Feb. 21, 2003 (JP) .............................. 2003-044945

(51) Int. Cl.
*H04H 20/71* (2008.01)
(52) U.S. Cl. .................. 370/312; 370/432; 370/338; 370/475; 370/473; 370/401
(58) Field of Classification Search .......... 455/450, 455/452.1, 452.2, 434, 464; 370/400, 406, 370/329, 342, 312, 432, 338, 475, 473, 401
See application file for complete search history.

(56) References Cited

U.S. PATENT DOCUMENTS

| | | | |
|---|---|---|---|
| 5,475,819 A | | 12/1995 | Miller et al. |
| 6,097,703 A | | 8/2000 | Larsen et al. |
| 6,131,038 A | * | 10/2000 | Sekine ........................ 455/513 |
| 6,141,319 A | | 10/2000 | Dighe et al. |
| 6,167,270 A | * | 12/2000 | Rezaiifar et al. ............ 455/442 |
| 6,574,266 B1 | * | 6/2003 | Haartsen ..................... 375/133 |

(Continued)

FOREIGN PATENT DOCUMENTS

JP 8-298687 11/1996

(Continued)

OTHER PUBLICATIONS

Atsushi Fujiwara, et al., "Area Coverage and Capacity Enhancement by Multihop Connection of CDMA Cellular Network", IEEE 56th Vehicular Technology Conference Proceedings, Sep. 24-28, 2002, XP 010608858, pp. 2371-2374.

*Primary Examiner*—Charles N Appiah
*Assistant Examiner*—Kwasi Karikari
(74) *Attorney, Agent, or Firm*—Oblon, Spivak, McClelland, Maier & Neustadt, L.L.P.

(57) ABSTRACT

The multi-hop communication system according to the present invention is configured by a radio control station 1 connected to a core network, and radio stations 21, 22, 31-33. The radio control station 1 has a control signal TX/RX unit 12 which transmits/receives the control signal, an information signal TX/RX unit 13 which transmits/receives the information signal, and a communication channel controller 15 which transmits a "usage notification" indicating usage of communication channels managed by the radio control station 1 to the radio stations 21, 22, 31-33 using the control signal. The radio station has a control signal TX/RX unit 42 which transmits/receives the control signal, and an information signal TX/RX unit 43 which transmits/receives the information signal.

12 Claims, 13 Drawing Sheets

U.S. PATENT DOCUMENTS

| | | | |
|---|---|---|---|
| 6,576,266 B1* | 6/2003 | Mayllott et al. | 424/725 |
| 6,704,301 B2* | 3/2004 | Chari et al. | 370/351 |
| 6,751,196 B1* | 6/2004 | Hulyalkar et al. | 370/252 |
| 6,904,290 B1* | 6/2005 | Palenius | 455/522 |
| 2001/0036810 A1 | 11/2001 | Larsen | |
| 2002/0009061 A1* | 1/2002 | Willenegger | 370/328 |
| 2003/0058826 A1* | 3/2003 | Shearer, III | 370/338 |
| 2003/0078010 A1* | 4/2003 | Davis | 455/69 |
| 2003/0210664 A1* | 11/2003 | Achour et al. | 370/329 |
| 2004/0018843 A1* | 1/2004 | Cerwall et al. | 455/450 |
| 2004/0029553 A1* | 2/2004 | Cain | 455/403 |
| 2004/0085909 A1* | 5/2004 | Soliman | 370/252 |
| 2004/0114555 A1* | 6/2004 | Hayashi et al. | 370/329 |
| 2004/0157613 A1* | 8/2004 | Steer et al. | 455/446 |
| 2004/0203828 A1* | 10/2004 | Mirchandani et al. | 455/452.1 |
| 2005/0013253 A1* | 1/2005 | Lindskog et al. | 370/238 |
| 2005/0085231 A1* | 4/2005 | Dillinger et al. | 455/445 |
| 2005/0129005 A1* | 6/2005 | Srikrishna et al. | 370/356 |
| 2005/0136951 A1* | 6/2005 | Gibbons et al. | 455/464 |

FOREIGN PATENT DOCUMENTS

| | | |
|---|---|---|
| JP | 2001-237764 | 8/2001 |
| JP | 2001-292093 | 10/2001 |
| JP | 2002-26923 | 1/2002 |
| WO | 01/24402 | 4/2001 |
| WO | WO 01/30035 A2 | 4/2001 |
| WO | 01/65399 | 9/2001 |

* cited by examiner

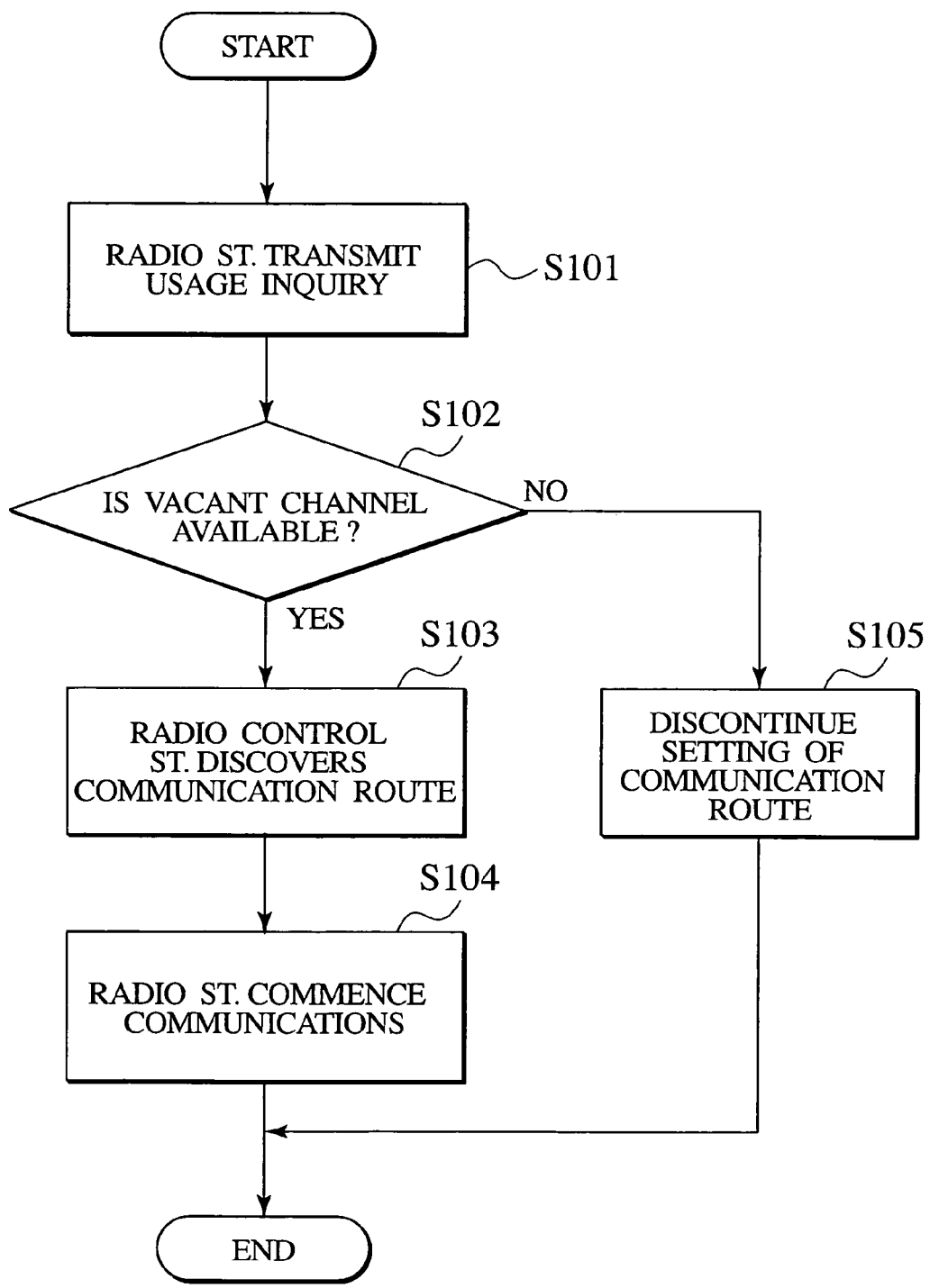

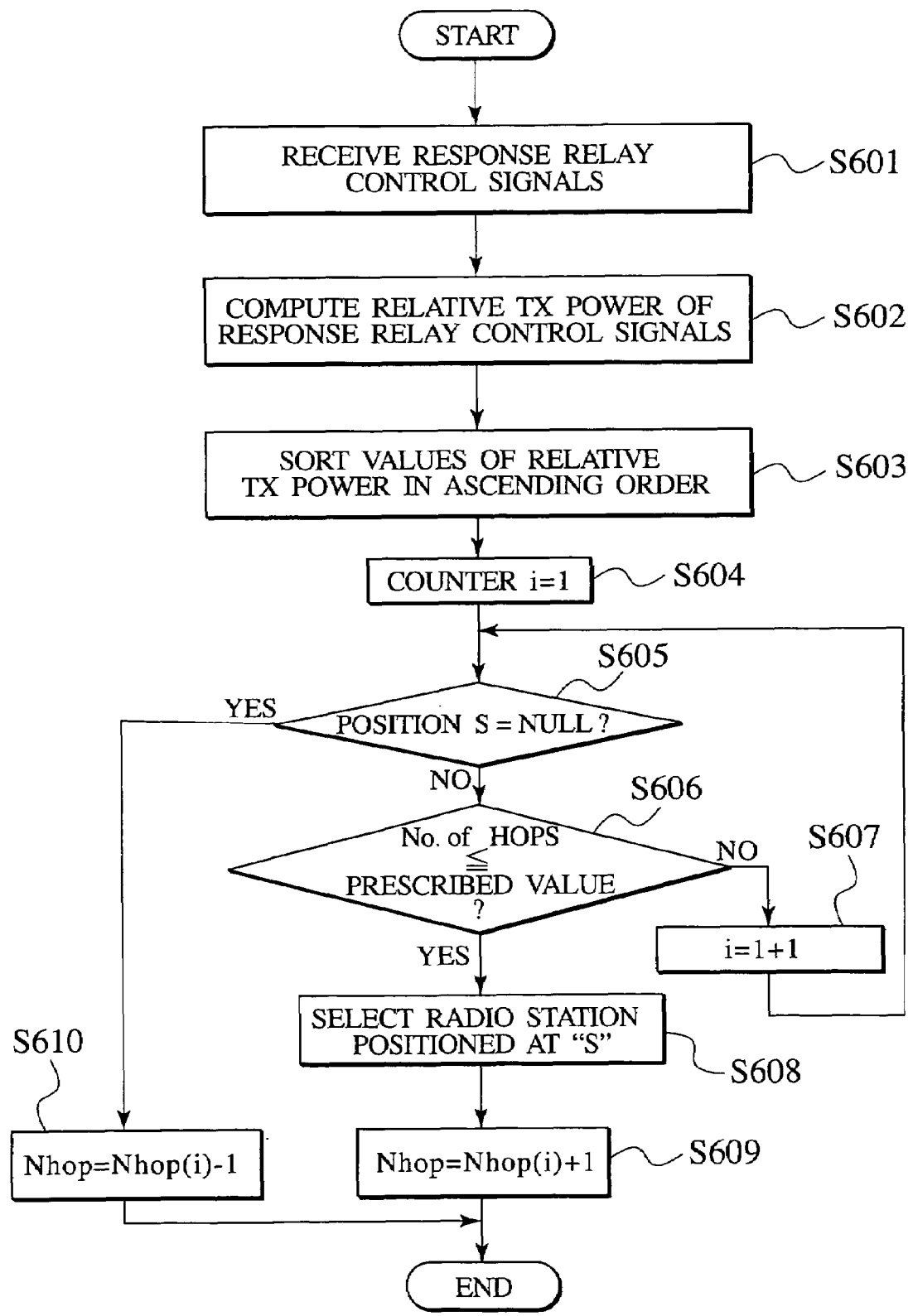

| TRANSMITTING STATION ID | REQUIRED TX POWER | TRANSMITTING STATION ID | REQUIRED TX POWER | ... | TRANSMITTING STATION ID | REQUIRED TX POWER | TRANSMITTING STATION ID | RELAYING STATION ID | ously.

MULTI-HOP COMMUNICATION SYSTEM, RADIO CONTROL STATION, RADIO STATION AND MULTI-HOP COMMUNICATION METHOD

CROSS REFERENCE TO RELATED APPLICATIONS

This application is based upon and claims the benefit of priority from the prior Japanese Patent Applications No. P2003-044945, filed on Feb. 21, 2003; the entire contents of which are incorporated herein by reference.

BACKGROUND OF THE INVENTION

1. Field of the Invention

The present invention relates to a multi-hop communication system and a multi-hop communication method, which are configured by a radio control station and radio stations. The present invention also relates to a radio control station and a radio station used in the multi-hop communication system. Specifically, the present invention relates to a cellular phone system, in which a radio base station acts as the radio control station, and a wireless LAN, in which an access point acts as the radio control station.

2. Description of the Related Art (Ad Hoc Network)

In an ad hoc network, communications between two stations, which cannot directly communicate with each other, are achieved using multiple stations. The multiple stations relay signals transmitted by the origin to the destination (which is called "multi-hop connection"). As for the ad hoc network, various kinds of commutation route discovery protocols have been proposed, i.e., DSR (Direct Source Routing) and AODV (Ad hoc On demand Distance Vector).

In such ad hoc networks, a centralized control station like the base station in the cellular phone system does not exist. Therefore, normally the radio station itself discovers a communication route autonomously.

(Multi-hop Cellular)

In this regard, the multi-hop cellular, in which a communication route from the radio station to the base station is acquired by a multi-hop connection, has also been proposed. In the multi-hop cellar, since the radio station can access to a core network via the base station, communications with the destination becomes possible if a communication route up to the base station is acquired. Therefore, probability of connection with the distant destination is higher than the ad hoc network.

However, in the multi-hop cellular, methods of communication between the radio stations and acquisition of a communication route between the radio station and the base station have still been considered. It is highly desirable that such processes are performed within a short period of time with a small amount of controlling signals.

Further, communications cannot be performed between the radio stations if communication channels handled by the base station are fully occupied. In this case, since packets, which are not received by any radio station/base station, are transmitted, resources of the multi-hop cellular are wasted.

Moreover, it is known that in a radio communication system, higher transmission power is required as transmission speed (bit rate) increases. Therefore, power consumption at the radio station/base station may become excessive if the bit rates for transmitting both control signal and information signal are increased simultaneously.

BRIEF SUMMARY OF THE INVENTION

The present invention has been made in view of the above perspectives, and thus has an object of providing a multi-hop communication system, a radio control station, a radio station and a multi-hop communication method, which enables acquisition of an appropriate communication routes between the radio stations or between the radio station and the radio control station with small amount of control signals.

In order to achieve the above object, a multi-hop communication system according to the present invention, which is configured by a radio control station that is connected to a core network, and radio stations that relay an information signal transmitted by other radio stations, determines a communication route for a control signal and a communication route for an information signal by different independent processes. The control signal and the information signal are transmitted by the determined communication routes.

BRIEF DESCRIPTION OF THE SEVERAL VIEWS OF THE DRAWINGS

FIG. 3 is a flowchart showing a multi-hop communication method according to the first embodiment;

FIG. 7 is a flowchart showing processes performed in the communication route selector according to the second embodiment;

DETAILED DESCRIPTION OF THE INVENTION

FIRST EMBODIMENT (Configuration of Multi-hop Communication System)

Figure 1A:
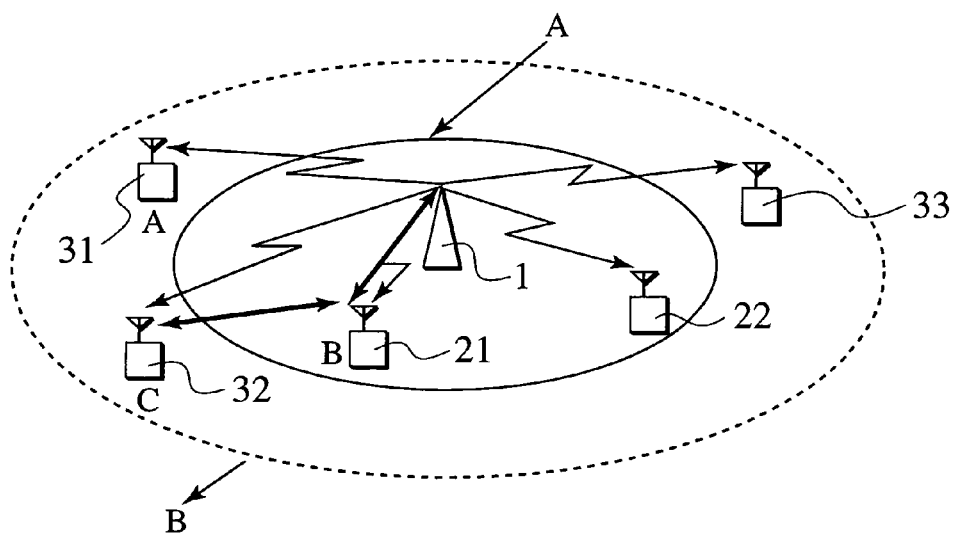
FIG. 1A is a schematic diagram showing overall configuration of a multi-hop communication system according to a first embodiment.

A first embodiment of the present invention will now be described with reference to the drawings. FIG. 1A is a schematic diagram showing overall configuration of the multi-hop communication system.

As shown in FIG. 1A, the multi-hop communication system is configured by a radio control station 1 connected to a core network, e.g., a wideband wired network, and radio stations 21, 22, 31-33 located either inside or outside of an area A that is covered by the radio control station 1. Incidentally, area A means an area, in which the radio control station 1 can directly transmits/receives an information signal with the radio stations 21, 22, 31-33. The information signal contains user information, e.g., data packets and voice packets.

Figure 1B:
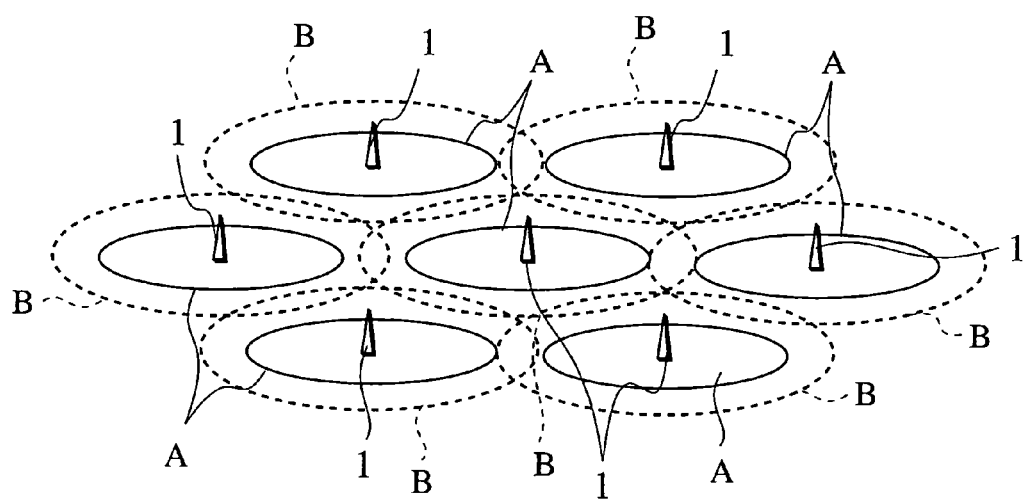
FIG. 1B is an area configuration of the multi-hop communication system according to the first embodiment.

As shown in FIG. 1B, a plurality of the area A is deployed. Further, an area B is located outside of each area A. Each area B has a shape of a ring and is overlapped with the other areas B.

As shown in FIG. 1A, the radio stations 21, 22 are located in the area A of the radio control station 1. On the other hand, the radio stations 31-33 are located outside of the area A. Therefore, the radio stations 31-33 cannot directly transmit the information signal to the radio control station 1. However, the radio stations 31-33 are located in the area B of the radio control station 1. The radio stations 31-33 can transmit/receive only the control signal, i.e., a pilot signal, to the radio control station 1.

In the multi-hop communication system in the embodiment, the control signal, i.e., a pilot signal, is transmitted with a lower bit rate in comparison with the information signal.

Figure 2A:
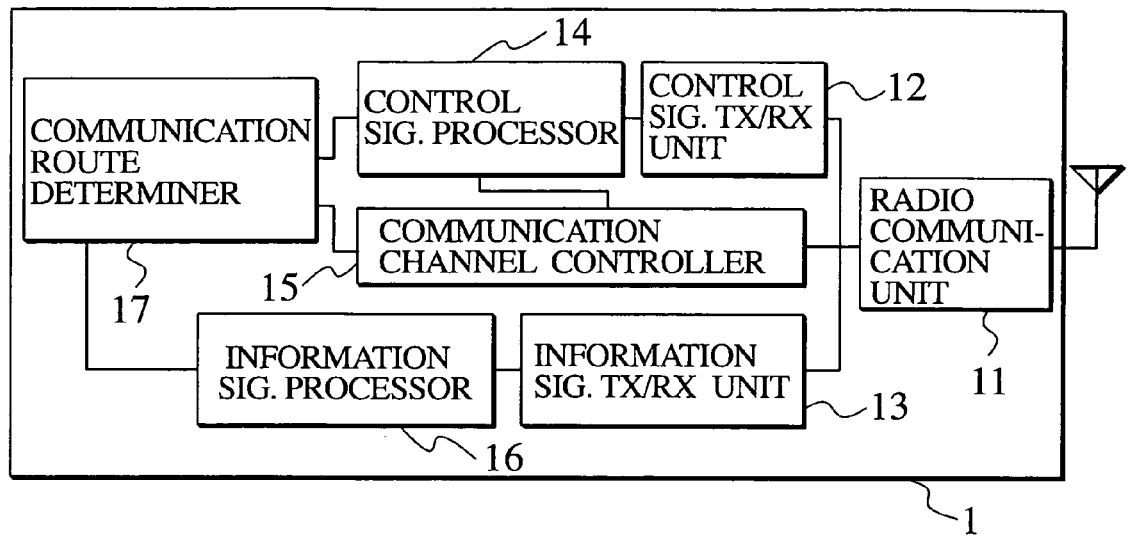
FIG. 2A is a block diagram of a radio control station according to the first embodiment.
Figure 2B:
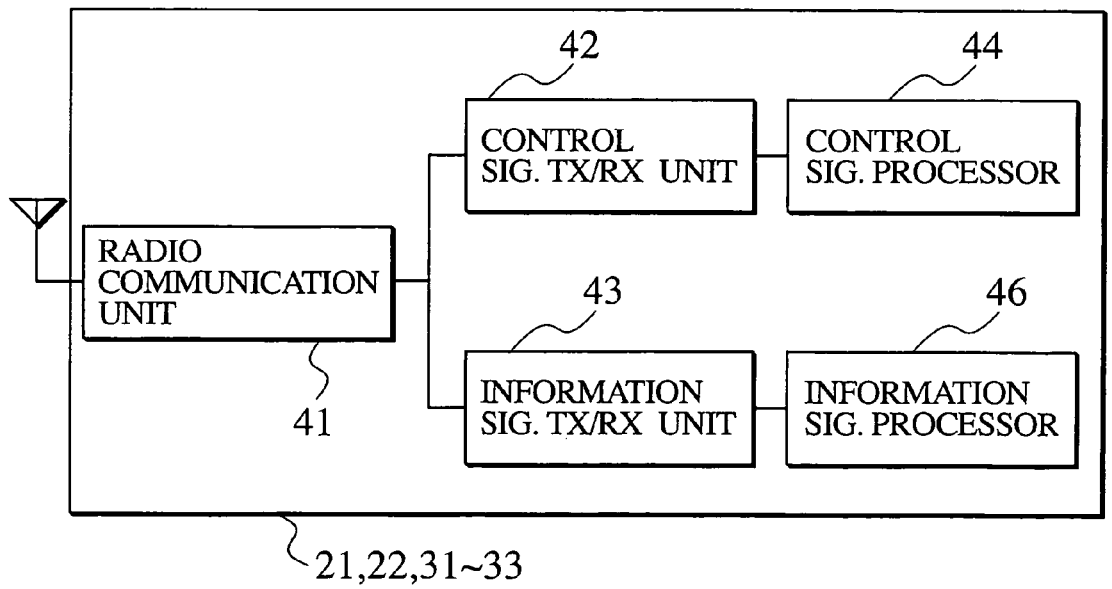
FIG. 2B is a block diagram of a radio station according to the first embodiment.

FIG. 2A is a block diagram of the radio control station 1, and FIG. 2B is a block diagram of the radio stations 21, 22, 31-33.

As shown in FIG. 2A, the radio control station 1 has a radio communication unit 11 which transmits/receives the information signal and the control signal using a radio communication scheme (e.g., CDMA), a control signal TX/RX unit 12 which transmits/receives the control signal, a control signal processor 14 which generates/processes the control signal.

Further, the radio control station 1 has a communication channel controller 15 which transmits a "usage notification" indicating usage of communication channels managed by the radio control station 1 to the radio stations 21, 22, 31-33 using the control signal.

Moreover, the radio control station 1 also has a communication route determiner 17 which determines a communication route for the information signal and the control signal, an information signal TX/RX unit 13 which transmits/receives the information signal, and an information signal processor 16 which generates/processes the information signal.

The communication route determiner 17 determines a communication route for transmission/reception of the control signal by a different independent process from the process for determination of a communication route for transmission/reception of the information signal.

Specifically, the communication route determiner 17 determines if the radio control station 1 can directly transmit/receive the information signal with the radio station based on a reception level of the control signal (e.g., a pilot signal) received at the control signal TX/RX unit 12.

At this point in time, transmission/reception of the control signal is performed directly with the radio station as a different independent process using the control signal TX/RX unit 12. The process has no relations to the processes for determination of a communication route for the information signal. It means that two different communication routes may be set between the radio control station 1 and the radio station. Such as a communication route for the control signal, of which bit rate is lower than the information signal, and a communication route for the information signal.

The control signal, of which bit rate is lower than the information signal, can cover a larger transmission area in comparison with the information signal. Therefore, the radio control station 1 and the radio station (21, 22, 31-33) can transmit/receive the control signal even if the radio control station 1 and the radio station (21, 22, 31-33) is distant, as they cannot directly transmit/receive the information signal.

Further, the communication route determiner 17 can estimate the distance between the radio control station 1 and the radio station according to the reception level of the control signal (e.g., the pilot signal) transmitted by the radio station. The communication route determiner 17 can also determine whether transmission/reception of the information signal directly performed with the radio station.

Incidentally, the control signal TX/RX unit 12 can directly transmit/receive the information signal between the radio control station 1 and the radio station. Further, the control signal TX/RX unit 12 can perform the multi-hop connection for transmission/reception of the information signal via a plurality of the radio stations.

Moreover, in this embodiment, although the communication route determiner 17 is located in the radio control station 1, the present invention is not limited to such embodiment. The communication route determiner having above described function may be located in the radio station 21, 22, 31-33 in order for the radio stations to determine the communication routes for the information signal and the control signal by a different independent processes.

As shown in FIG. 2B, the radio stations 21, 22, 31-33 have a radio communication unit 41 which transmits/receives the information signal and the control signal using a radio communication scheme (e.g., CDMA), a control signal TX/RX unit 42 which transmits/receives the control signal, a control signal processor 44 which generates/processes the control signal.

Further, the radio stations 21, 22, 31-33 also have an information signal TX/RX unit 43 which transmits/receives the information signal and an information signal processor 46 which generates/processes the information signal.

Incidentally, the control signal processor 44 can transmit a usage inquiry for inquiring usage of the communication channel handled by the radio control station 1 through the control signal. The control signal processor 44 can also transmit/receive the information signal according to a usage notification that is a response to the usage inquiry.

(Operation of the Multi-hop Communication System)

Hereinafter, an operation of the multi-hop communication system according to the embodiment will be described. FIG. 3 is a flowchart showing an operation of the multi-hop communication system.

As shown in FIG. 3, in step S101, the radio station (either one of radio stations 21, 22, 31-33) transmits the usage inquiry for inquiring usage of the communication channel to the radio control station 1 without a relay by the other radio station, i.e., directly, when commencing communications via the radio control station 1.

In step S102, the radio control station 1 checks whether or not a vacant communication channel is available according to the usage inquiry transmitted in the step S101.

Specifically, the communication channel controller 15 that manages usage of the communication channel(s) handled by the radio control station 1 checks the usage of the communication channel and decides whether or not the vacant communication channel is available.

If the vacant channel is available ("Y" in the step S102) in step S103, the radio control station 1 discovers a communication route for transmission/reception of the information signal.

In step S104, the radio control station 1 commences transmission/reception of the information signal, i.e., communications with the radio station using the communication route discovered in the step S103.

On the other hand, if no vacant channel is available ("N" in the step S102), in step S105, the radio control station 1 determines that communication is not possible with the radio station and then discontinues setting of the communication route to the radio station.

(Effects)

According to the first embodiment heretofore described, the radio station (the radio stations 21, 22, 31-33) inquiries usage of the communication channel handled by the radio control station 1 before transmission/reception of the information signal. Further, the radio station determines setting of a communication route based on the availability of the vacant channel.

Therefore, performing the process of the communication channel setting by the radio station with the radio control station 1 can be reduced even if no vacant communication channel is available.

Specifically, since packets for communication route discovery is not transmitted when the communication channels are fully occupied, a waste of resources in the multi-hop communication system can be prevented.

SECOND EMBODIMENT (Configuration of Multi-hop Communication System)

Hereinafter, a second embodiment of the present invention will be described. FIG. 4 is a schematic diagram showing overall configuration of the multi-hop communication system according to the embodiment. In the embodiment, whether or not communication is directly conducted between the radio station and the radio control station is determined based on a reception level of the control signal (e.g., a pilot signal).

Figure 4A:
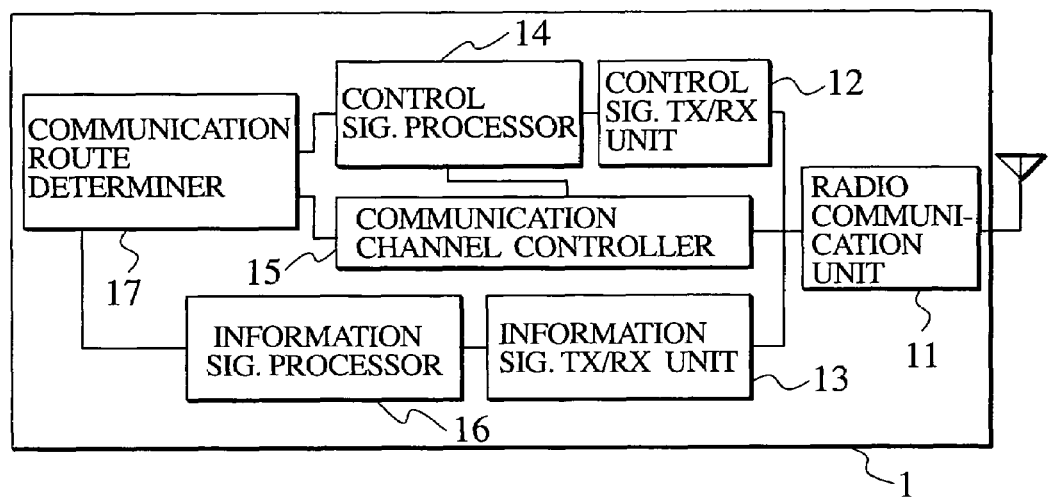
FIG. 4A is a block diagram of a radio control station according to a second embodiment.

As shown in FIG. 4A, it is similar to the first embodiment, the radio control station 1 has a radio communication unit 11 which transmits/receives the information signal and the control signal using a radio communication scheme (e.g., CDMA), a control signal TX/RX unit 12 which transmits/receives the control signal, a control signal processor 14 which generates/processes the control signal.

Further, the radio control station 1 has a communication channel controller 15 which transmits a "usage notification" indicating usage of communication channels managed by the radio control station 1 to the radio stations 21, 22, 31-33 using the control signal.

Moreover, the radio control station 1 also has a communication route determiner 17 which determines a communication route for the information signal and the control signal, an information signal TX/RX unit 13 which transmits/receives the information signal, and an information signal processor 16 which generates/processes the information signal.

The communication route determiner 17 determines a communication route for transmission/reception of the control signal by a different independent process from the process for determination of a communication route for transmission/reception of the information signal.

Specifically, the communication route determiner 17 determines if the radio control station 1 can directly transmit/receive the information signal with the radio station based on a reception level of the control signal (e.g., a pilot signal) received at the control signal TX/RX unit 12.

At this point in time, transmission/reception of the control signal is performed directly with the radio station as a different independent process using the control signal TX/RX unit 12. The process has no relations to the processes for determination of a communication route for the information signal. It means that two different communication routes may be set between the radio control station 1 and the radio station. Such as a communication route for the control signal, of which bit rate is lower than the information signal, and a communication route for the information signal.

The control signal, of which bit rate is lower than the information signal, can cover a larger transmission area in comparison with the information signal. Therefore, the radio control station 1 and the radio station (21, 22, 31-33) can transmit/receive the control signal even if the radio control station 1 and the radio station (21, 22, 31-33) is distant, as they cannot directly transmit/receive the information signal.

Further, the communication route determiner 17 can estimate the distance between the radio control station 1 and the radio station according to the reception level of the control signal (e.g., the pilot signal) transmitted by the radio station. The communication route determiner 17 can also determine whether transmission/reception of the information signal directly performed with the radio station.

Incidentally, the control signal TX/RX unit 12 can directly transmit/receive the information signal between the radio control station 1 and the radio station. Further, the control signal TX/RX unit 12 can perform the multi-hop connection for transmission/reception of the information signal via a plurality of the radio stations.

Moreover, in this embodiment, although the communication route determiner 17 is located in the radio control station 1, the present invention is not limited to such embodiment. The communication route determiner having above described function may be located in the radio station 21, 22, 31-33 in order for the radio stations to determine the communication routes for the information signal and the control signal by a different independent process.

Figure 4B:
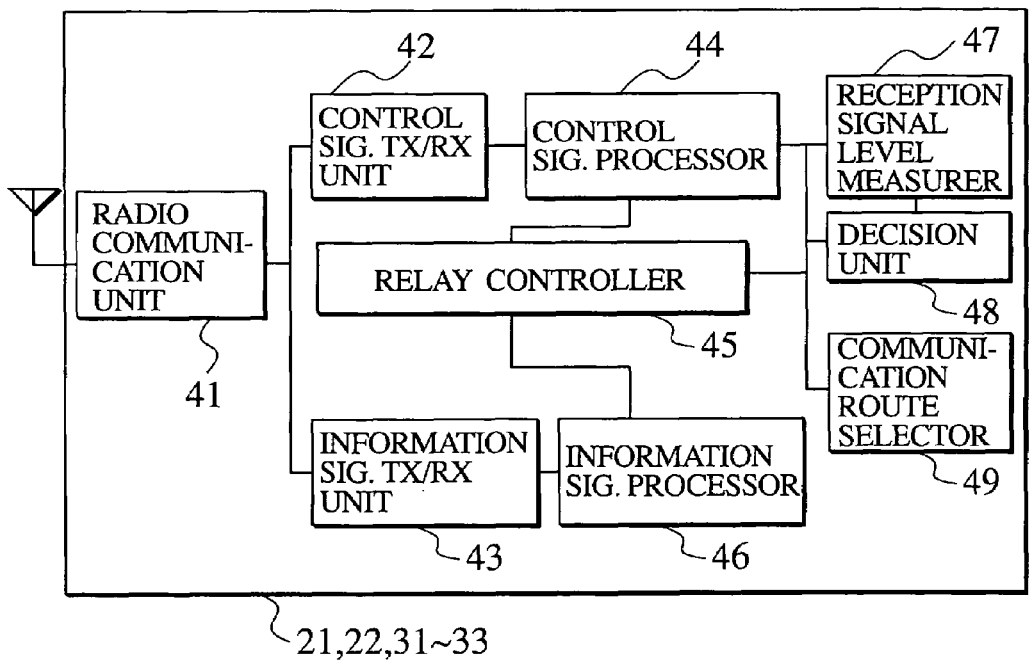
FIG. 4B is a block diagram of a radio station according to the second embodiment.

As shown in FIG. 4B, the radio stations 21, 22, 31-33 have a radio communication unit 41 which transmits/receives the information signal and the control signal using a radio communication scheme (e.g., CDMA), a control signal TX/RX unit 42 which transmits/receives the control signal, a control signal processor 44 which generates/processes the control signal.

Further, the radio stations 21, 22, 31-33 have an information signal TX/RX unit 43 which transmits/receives the information signal and an information signal processor 46 which generates/processes the information signal.

Moreover, the radio stations 21, 22, 31-33 of the embodiment also have a relay controller 45, a reception signal level measurer 47, a decision unit 48 and a communication route selector 49.

The relay controller 45 transmits a "relay control signal" for requesting a relay of the information signal to the other station and sets a communication route to the radio control station via the other station according to a "response relay control signal" that is a response to the relay control signal. Incidentally, in the embodiment, the relay controller 45 configures a first relay controller.

Further, the relay controller 45 receives a relay control signal requesting a relay of the information signal from the other station. The relay controller 45 then transmits a response relay control signal that is a response to the relay control signal and sets a communication route from the other radio station to the radio control station 1. Incidentally, in the embodiment, the relay controller 45 configures a second relay controller.

The reception signal level measurer 47 measures a reception level of a pilot signal transmitted by the radio control station 1 and sends a result of the measurement to the decision unit 48.

The decision unit 48 decides whether or not communication is directly conducted with the radio control station 1 based on a reception level of the pilot signal received by the control signal TX/RX unit 42.

Specifically, the decision unit 48 stores the threshold(s) for the reception level of the pilot signal. Then whether or not information signal is directly transmitted to the radio control station 1 is decided by the decision unit 48 based on the result of comparison of the reception level and the threshold.

The communication route selector 49 selects a radio station satisfying a prescribed condition regarding a communication state if a plurality of the other radio stations transmitted the response relay control signal.

The communication route selector 49 can select a communication route according to the methods described below.

(1) Selection Based on SIR and the Number of Hops

In this method, the communication route selector 49 selects a communication route to the radio control station 1 based on an SIR (signal to interference ratio) and the number of hops.

Figures 5A, 5B:
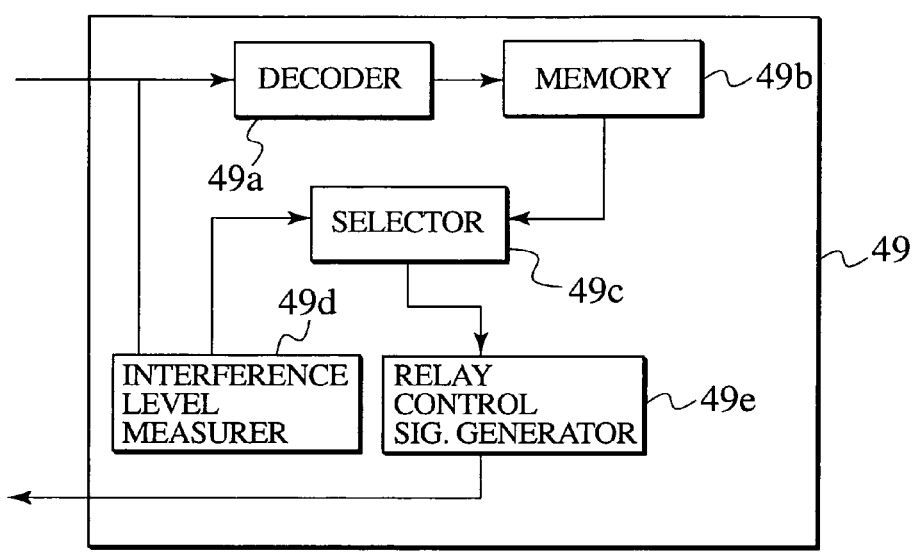
FIG. 5A is a block diagram of a communication route selector located in the radio station according to the second embodiment.
FIG. 5B is a diagram showing configuration of a relay control signal according to the second embodiment.

As shown FIG. 5A, the communication route selector 49 is configured by a decoder 49*a* for decoding a received control signal, an interference level measurer 49*d* for measuring a level of interference imposed on the pilot signal, a selector 49*c* for selecting the other radio station which relays the information signal, a memory 49*b* for memorizing the number of hops, and a relay control signal generator 49*e* for adding information of the radio station itself to the received relay control signal (or the response relay control signal) and generating a new response relay control signal.

Further, as shown in FIG. 5B, a station ID, source station ID, an interference level and the number of hops up to the radio control station 1 are included in the response relay control signal. The radio station adds the station ID, the interference level and the number of hops to the response relay control signal received from the other radio station and then transmits the response relay control signal.

Each radio station received the relay control signal (or the response relay control signal) selects a radio station to be located on a next hop based on the SIR and the number of hops.

In other words, each radio station selects a radio station, of which the number of hops to the radio control station 1 is smallest based on the response relay control signal. Further, if two or more communication routes having the same number of hops are available, each radio station selects a ratio station, of which SIR is highest.

Figure 6:
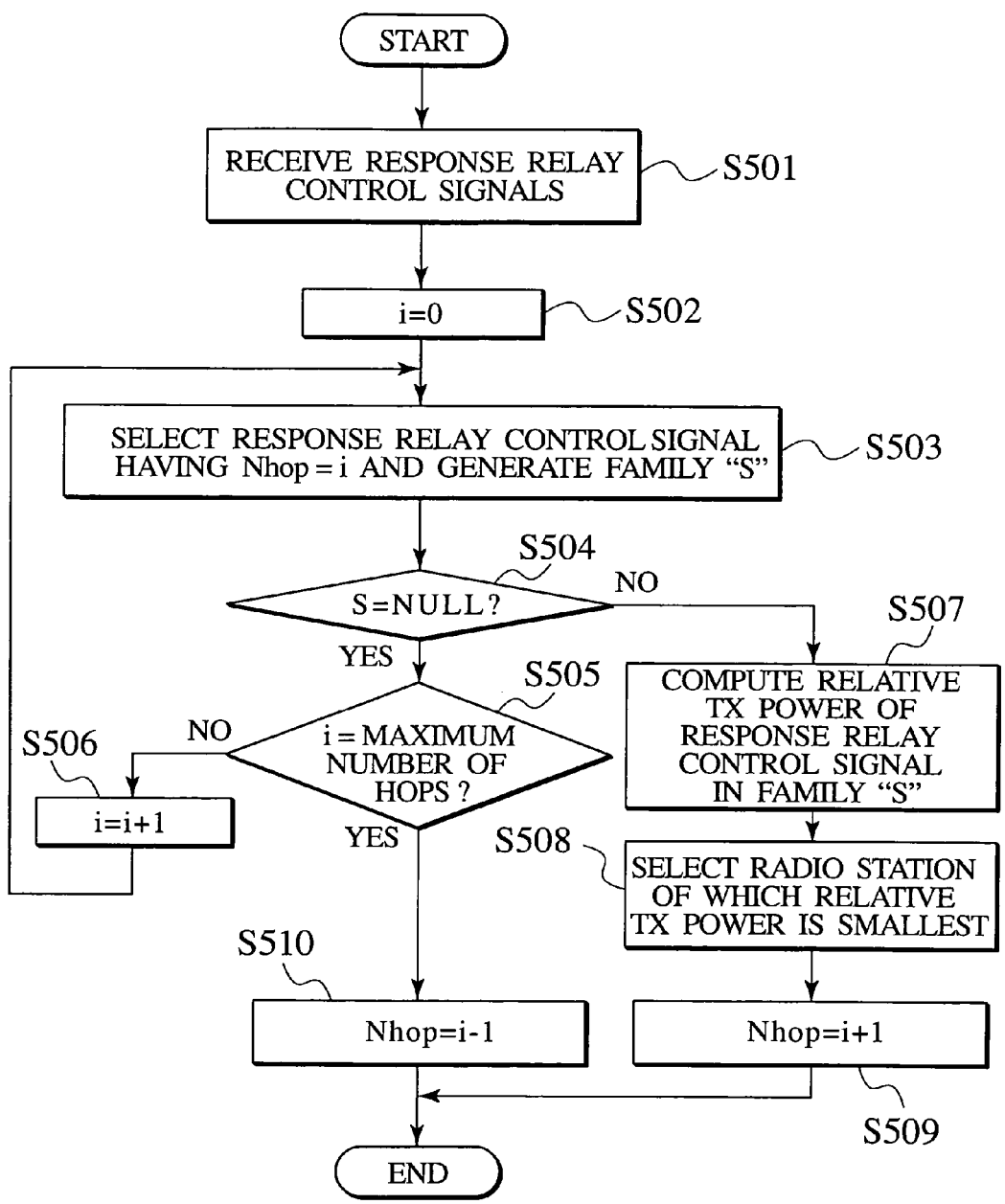
FIG. 6 is a flowchart showing processes performed in the communication route selector according to the second embodiment.

Specifically, as shown in FIG. 6, in step S501, the control signal TX/RX unit 42 receives the relay control signals (or the response relay control signals) from the other radio station.

In step S502, the communication route selector 49 initializes the counter i for counting the number of hops.

In step S503, the communication route selector 49 selects the response relay control signal, of which number of hops (Nhop) is equal to "i", and generates a family "S" configured by the response relay control signal, of which number of hops (Nhop) is equal to "i".

In step S504, the communication route selector 49 checks whether or not the family "S" is null.

If the family "S" is null ("Y" in the step S504), in step S505, the communication route selector 49 checks whether or not the value of the counter "i" is below the maximum number of hops determined in advance.

If the value of the counter "i" is not below the maximum number of hops ("N" in the step S505), in step S506, the communication route selector 49 adds "1" to the counter "i"

The communication route selector 49 again performs processes starting from the step S503 based on the new value of the counter "i".

On the other hand, if the family "S" is not null ("N" in the step S504), in step S507, the communication route selector 49 computes a relative transmission power of the response relay control signal (the pilot signal) included in the family "S".

In step S508, the communication route selector 49 selects a radio station, of which relative transmission power is smallest based on the relative transmission power.

In step S509, the communication route selector 49 adds "1" to the counter "i" and then concludes the process.

Further, if the value of the counter "i" is equal to the maximum number of hops ("Y" in the step S505), in step S506, the communication route selector 49 reduces "1" from the counter "i" and then concludes the process.

According to the method described above, the radio station can select a radio station, of which number of hops up to the radio control station 1 is smallest as well as the SIR is largest as a radio station to relay the information signal. The radio station then transmits the response relay control signal containing information of the radio station itself (i.e., the station ID, the interference level and the number of hops) to the selected radio station.

(2) Selection Based on Relative Transmission Power

As a second method, the communication route selector 49 can select a radio station, of which relative transmission power is smallest. The relative transmission power is computed base on an SIR of the response relay control signal (the pilot signal) and an interference level imposed to the response relay control signal.

In this method, the radio station computes a relative transmission power of each response relay control signal received from the other stations. The radio station then sorts the values of the relative transmission power in an ascending order.

Further, the radio station checks whether or not the number of hops is below a prescribed value about the sorted response relay control signal. If the number of hops is below the prescribed value, the radio station selects the radio station that transmitted such response relay control signal as a radio station to relay the information signal.

Incidentally, the relative transmission power is computed based on the difference between the SIR of the response relay control signals and the interference level imposed to the response relay control signal.

As shown in FIG. 7, in step S601, the control signal TX/RX unit 42 receives the response relay control signals (or the relay control signals) from the other radio station.

In step S602, the communication route selector 49 computes the relative transmission power of all the response relay control signals.

In step S603, the communication route selector 49 sorts the values of the relative transmission power in an ascending order.

In step S604, the communication route selector 49 initializes the counter i for counting the position in the sorted values of the relative transmission power.

In step S605, the communication route selector 49 checks whether or not value positioned at "S" is null.

If value positioned at "S" is not null ("N" in the step S605), in step S606, the communication route selector 49 checks that the number of hops (Nhop) up to the radio control station 1 is equal to or less than the prescribed value.

If the number of hops is larger than the prescribed value ("N" in the step S606), in step S607, the communication route selector 49 adds "1" to the counter i and again performs processes starting from the step S605 based on the value of the response relay control signal positioned at a new position "S".

Further, if value is not located at the position "S" ("N" in the step S605), in step S610, the communication route selector 49 reduces "1" for the number of hops (Nhop) and then concludes the process.

If the number of hops is equal to or smaller than the prescribed value ("Y" in the step S606), in step S608, the communication route selector 49 selects the radio station that transmits the response relay control signal positioned at "S".

In step S609, the communication route selector 49 adds "1" for the number of hops (Nhop) and then concludes the process.

According to the method described above, the radio station can select a next hop radio station, of which the number of hops up to the radio control station 1 is equal to or below the prescribed value, and of which relative transmission power is smallest, as a radio station to relay the information signal.

Incidentally, large transmission power is normally required for transmission of the information signal, which is transmitted with a high bit rate. In view of this, the radio station (decision unit 48) may change threshold value for the reception level according to a transmission speed of the information signal.

Specifically, the radio station (decision unit 48) changes the threshold value for the reception level of the response relay control signal according to the bit rate (transmission speed) used in the information signal TX/RX unit 43. For example, the radio station (decision unit 48) increases the threshold value if the bit rate used in the information signal TX/RX unit 43 increases.

(3) Selection Based on the Total Transmission Power

As a third method, the communication route selector 49 can select a communication route so as to minimize the total transmission power of the radio stations relaying the information signal.

Figures 8A, 8B:
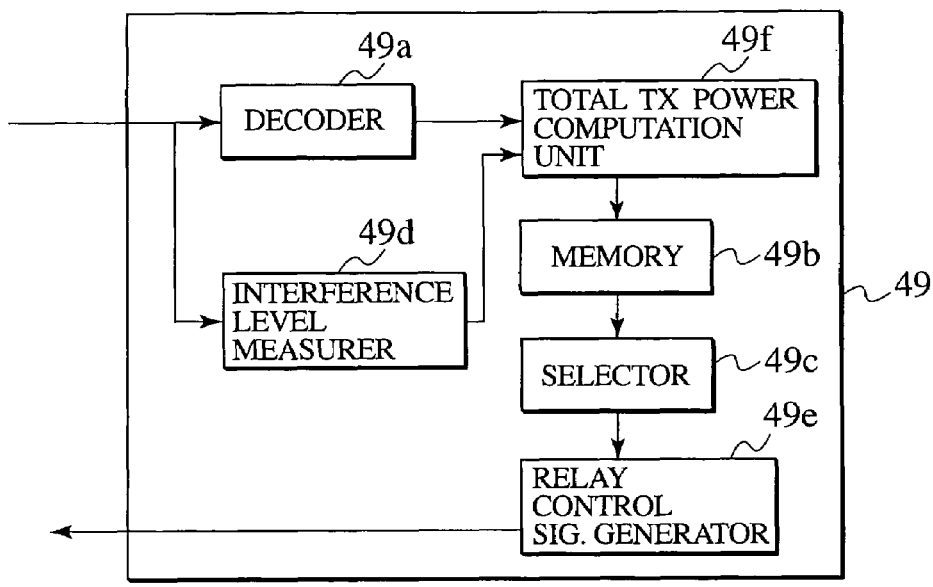
FIG. 8A is block diagram of a communication route selector located in the radio station according to the second embodiment.
FIG. 8B is a diagram showing configuration of the relay control signal according to the second embodiment.

In this method, as shown in FIG. 8A, the communication route selector 49 is configured by a decoder 49a, a memory 49b, a selector 49c, an interference level measurer 49d, a relay control signal generator 49e and a total transmission power computation unit 49f.

Further, as shown in FIG. 8B, in a response relay control signal, a transmitting station ID indicating a radio station that transmits a relay control signal, or a relay station ID indicating a radio station that relays the relay control signal (or the response relay control signal), and required transmission power are included.

The radio station to relay the relay control signal (or the response relay control signal) adds the identifier of the radio station itself and value of the required transmission power. Therefore, such information for all the radio stations located on the communication route can be gathered.

Figure 9:
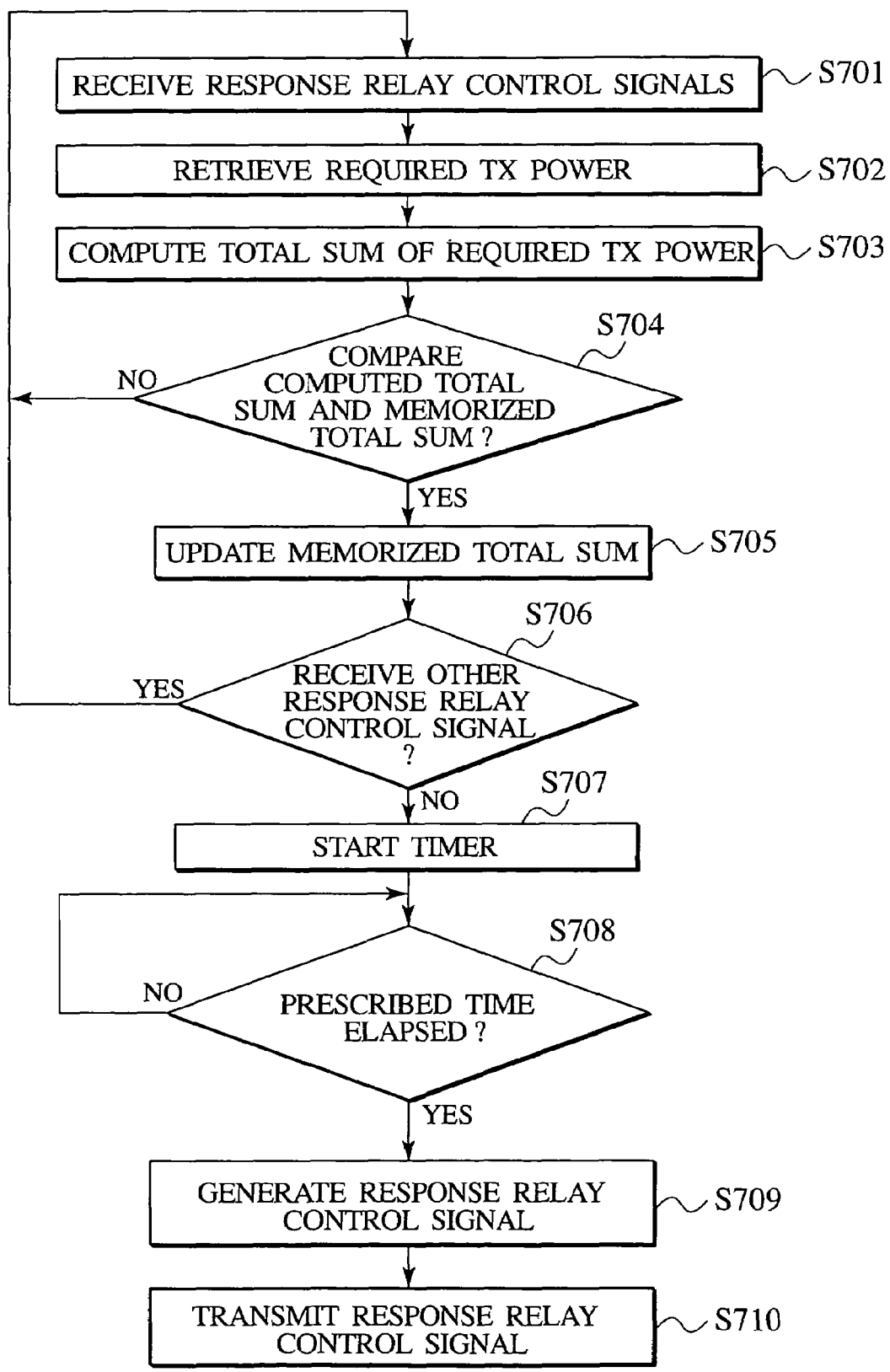
FIG. 9 is a flowchart showing processes performed in the communication route selector according to the second embodiment.

Specifically, as shown in FIG. 9, instep S701, the control signal TX/RX unit 42 receives the relay control signals (or the response relay control signals) from the other radio station.

Instep S702, the communication route selector 49 measures an SIR of the response relay control signal and retrieves the value of the required transmission power included in the response relay control signal.

In step S703, the communication route selector 49 computes the required transmission power at the radio station based on the measured SIR in the step S702, the desired SIR and predetermined value of the transmission power at the radio station that transmitted the relay control signals (or the response relay control signals).

Further, the communication route selector 49 computes the total sum of the values of the required transmission power included in the response relay control signal.

In step S704, the communication route selector 49 compares the total sum of the required transmission power computed in the step S703 and the total sum of the required transmission power, which has already been memorized in the memory 49b.

If the value of computed total sum is smaller than the memorized total sum ("Y" in the step S704), in step S705, the communication route selector 49 replaces the memorized total sum by the computed total sum so as to update the information in the in the memory 49b.

In step S706, the communication route selector 49 checks whether or not the other response relay control signal has been received at the control signal TX/RX unit 42.

If the other response relay control signal has been received ("Y" in the step S706), the communication route selector 49 again performs the processes of the steps S701 through S705 for the other response relay control signal.

On the other hand, if no response relay control signal has been received ("N" in the step S706), in step S707, the communication route selector 49 starts a timer.

In step S708, the communication route selector 49 checks elapsed time.

If a prescribed time elapsed ("Y" in the step S708), in step S709, the communication route selector 49 selects a radio station of a next hop, which relays the information signal, according to the information included in the response relay control signal. Further, the communication route selector 49 adds the identifier of the radio station itself and the value of the computed transmission power to the response relay control signal.

In step S710, the communication route selector 49 transmits the response relay control signal, which the identifier and the value have been added, to the other radio stations of the next hop.

(Operation of the Multi-hop Communication System)

Figure 10:
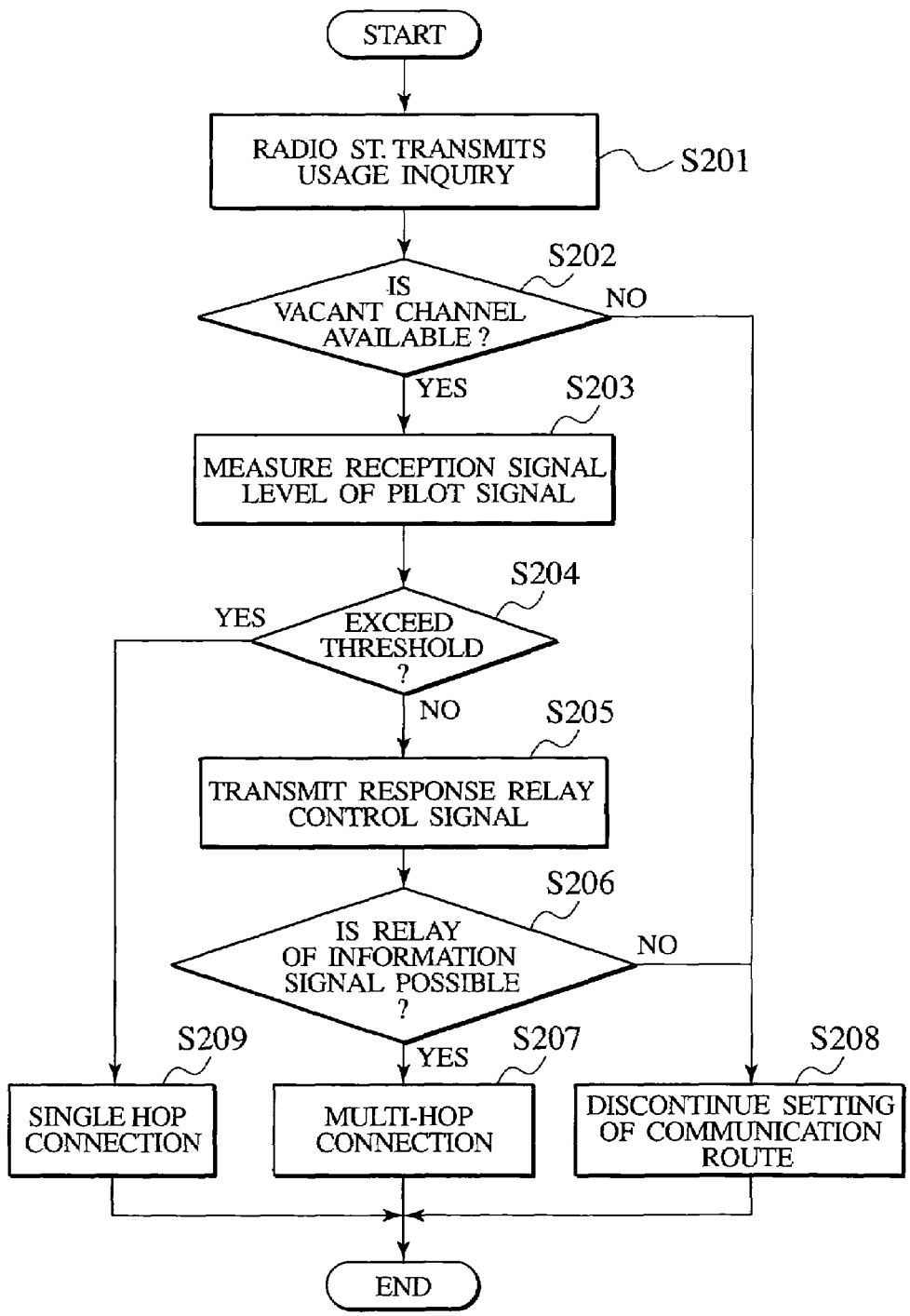
FIG. 10 is a flowchart showing a multi-hop communication method according to the second embodiment.

Hereinafter, an operation of the multi-hop communication system according to the embodiment will be described. FIG. 10 is a flowchart showing an operation of the multi-hop communication system.

As shown in FIG. 10, in step S201, the radio station (either one of radio stations 21, 22, 31-33) transmits the usage inquiry for inquiring usage of the communication channel to the radio control station 1 without a relay by the other radio station, i.e., directly, when commencing communications via the radio control station 1.

In step S202, the radio control station 1 checks whether or not a vacant communication channel is available according to the usage inquiry transmitted in the step S201.

Specifically, the communication channel controller 15 that manages usage of the communication channel(s) handled by the radio control station 1 checks the usage of the communication channel and decides whether or not the vacant communication channel is available.

If no vacant channel is available ("N" in the step S202) in step S208, the radio control station 1 determines that communication is not possible with the radio station, and then the radio control station 1 discontinues setting of the communication route to the radio station.

On the other hand, if the vacant channel is available ("Y" in the step s202), in step S203, the radio station measures a reception level of the pilot signal transmitted by the radio control station 1.

In step S204, whether or not the information signal is directly transmitted to the radio control station 1 is decided by the radio station based on the result of comparison of the reception level and the threshold being set.

If the reception level exceeds the threshold ("Y" in the step S204), in step S209, the radio station directly transmits the information signal to the radio control station 1 (i.e., single hop connection).

On the other hand, if the reception level does not exceed the threshold ("N" in the step S204), in step S205, the radio station transmits a relay control signal in order to request the other radio stations to relay the information signal.

In step S206, the radio station determines whether or not a relay of the information signal by the other radio station is possible based on the response relay control signal.

If the relay of the information signal by the other radio station is possible ("Y" in the step S206), in step S207, the radio station transmits the information signal to the radio control station 1 through the other radio station (i.e., multi-hop connection).

Incidentally, the radio control station 1 can assign a communication channel to be used in the radio station located on the determined communication route.

Figure 11:
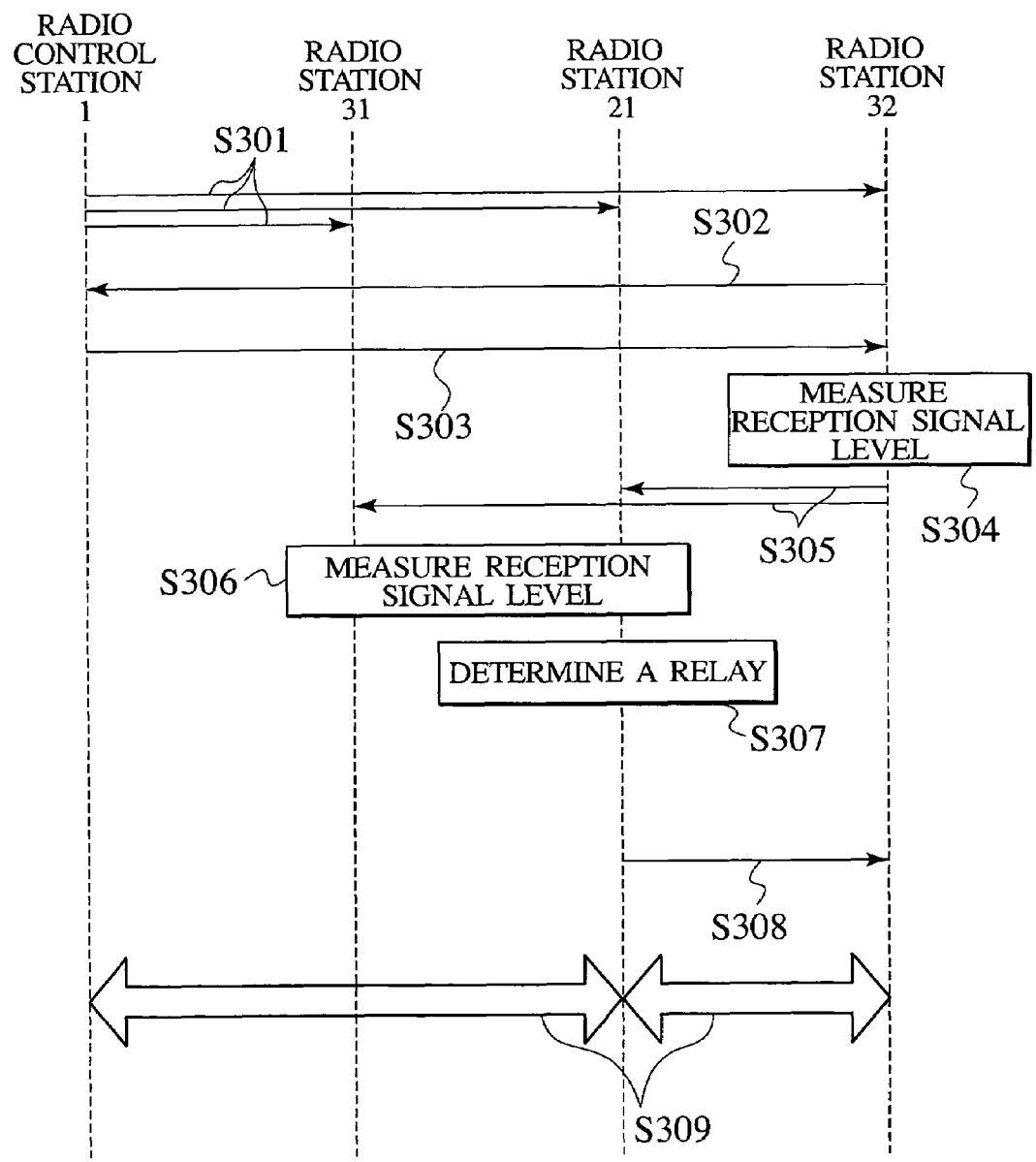
FIG. 11 is a sequence chart showing a communication sequence according to the multi-hop communication system in the second embodiment.

Hereinafter, the multi-hop communication method shown in FIG. 10 will be further described. FIG. 11 is a sequence chart showing a communication sequence between the radio stations 21, 31, 32 and the radio control station 1.

As shown in FIG. 11, in step S301, the radio stations 21, 31, 32 receive the pilot signal from the radio control station 1 periodically.

In step S302, the radio station 32 transmits a usage inquiry for inquiring usage of the communication channel handled by the radio control station 1.

In step S303, the radio control station 1 checks whether or not a vacant communication channel is available based on the usage inquiry. The radio control station 1 transmits a usage notification that notifies usage of the communication channel to the radio station 32.

In step S304, whether or not the information signal is directly transmitted to the radio control station 1 is determined by the radio station 32 based on a reception level of the pilot signal received most recently.

Incidentally, in this communication sequence, although the radio station 32 determines the communication route when commencing communication, the radio station 32 may also determine the communication route when it receives the pilot signal every time. This alternative allows discovering an appropriate communication route more rapidly.

In step S305, the radio station 32 transmits a relay control signal for requesting a relay of the information signal to the radio stations 21 and 31.

In step S306, the radio stations 21 and 31 measure a reception level of the pilot signal transmitted by the radio control station 1 in response to the relay control signal transmitted by the radio station 32.

In step S307, the radio station 21 determines that the information signal to be transmitted by the radio station 32 can be relayed to the radio control station 1.

In step S308, the radio station 21 transmits a response relay control signal to the radio station 32 to notify that information signal to be transmitted by the radio station 32 can be relayed.

In step S309, the radio stations 21 and 32 determine the communication route for transmission/reception of the information signal based on the response relay control signal.

Incidentally, if the radio station 21 cannot directly transmit the information signal to the radio control station 1, the radio station 21 further transmits the response relay control signal, which the information of the radio station 21 is added, to the other radio station (e.g., the radio station 22).

Then, whether or not the information signal to be transmitted by the radio station 32 can be directly relayed to the radio control station 1 is determined by the radio station 22. If the radio station 22 can relay the information signal to be transmitted by the radio station 32, the radio station 22 transmits a response relay control signal to notify the ability of the relay.

Further, the radio station 21 relays the response relay control signal transmitted by the radio station 22 to the radio station 32 so as to determine a communication route between the radio station 32 and the radio control station 1.

Moreover, the radio station may also add a value of a reception level of the pilot signal to the response relay control signal (or the relay control signal).

According to this arrangement, the radio station relaying the information signal can be selected based on the reception level in addition to the SIR and the number of hops. This allows that the radio station can select only the radio station, of which reception level of the pilot signal is higher. It is therefore prevented that the radio station located in more distant position from the radio control station 1 is selected to set a communication route via other stations.

THIRD EMBODIMENT

Figure 12:
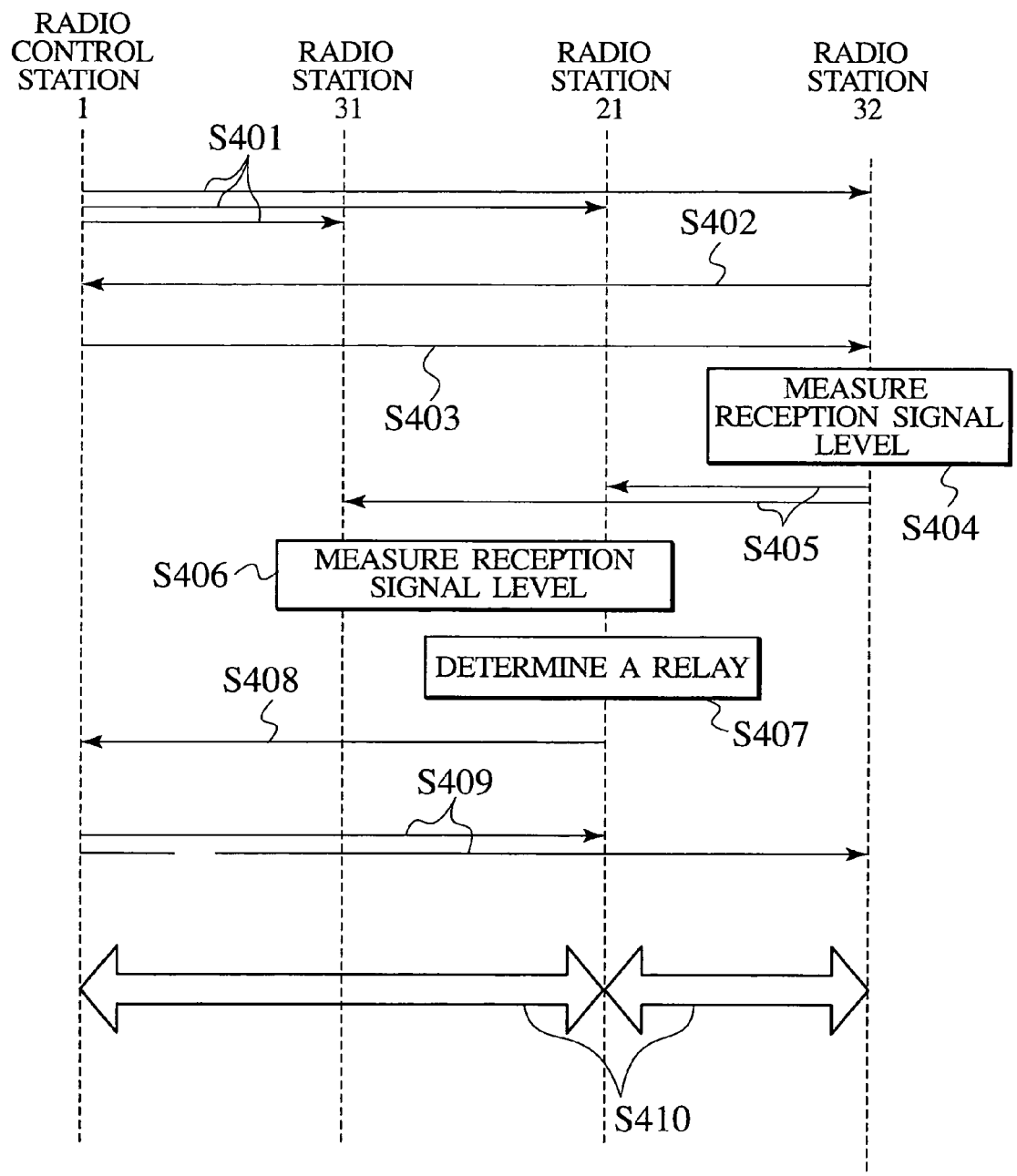
FIG. 12 is a sequence chart showing a communication sequence according to the multi-hop communication system in a third embodiment.

Hereinafter, a third embodiment of the present invention will be described. FIG. 12 is a sequence chart showing a communication sequence between the radio stations 21, 31, 32 and the radio control station 1.

In the embodiment, if the radio station determines that the information signal is directly relayed to the radio control station 1, the radio station transmits a communication route acquisition request to the radio control station 1.

Further, the radio control station 1 sets a communication route according to the communication route acquisition request, and transmits a communication route acquisition notification to each radio station. Incidentally, the radio control station 1 may transmits the communication route acquisition request and the radio station may transmit the communication route acquisition notification.

As shown in FIG. 12, in step S401, the radio stations 21, 31, 32 receive the pilot signal from the radio control station 1 periodically.

In step S402, the radio station 32 transmits a usage inquiry for inquiring usage of the communication channel handled by the radio control station 1.

In step S403, the radio control station 1 checks whether or not a vacant communication channel is available based on the usage inquiry. The radio control station 1 transmits a usage notification that notifies usage of the communication channel to the radio station 32.

In step S404, whether or not the information signal is directly transmitted to the radio control station 1 is determined by the radio station 32 based on a reception level of the pilot signal received most recently.

Incidentally, in this communication sequence, although the radio station 32 determines the communication route when commencing communication, the radio station 32may also determine the communication route when it receives the pilot signal every time. This alternative allows discovering an appropriate communication route more rapidly.

In step S405, the radio station 32 transmits a relay control signal for requesting a relay of the information signal by a multi-hop connection to the radio stations 21 and 31.

In step S406, the radio stations 21 and 31 measure a reception level of the pilot signal transmitted by the radio control station 1 in response to the relay control signal transmitted by the radio station 32.

In step S407, the radio station 21 determines that the information signal to be transmitted by the radio station 32 can be relayed to the radio control station 1.

In step S408, the radio station 21 transmits a communication route acquisition request for requesting acquisition of a communication route between the radio station 32 and the radio control station 1 to the radio control station 1.

In step S409, the radio control station 1 determines a communication route to the radio station 32 according to the communication route acquisition request transmitted by the radio station 21. The radio control station 1 then transmits a communication route acquisition notification for notifying information of the communication route (e.g., a station ID) to the radio stations 21 and 32.

The both radio stations 21 and 31 can recognize the communication route between the radio station 32 and the radio control station 1 by the communication route acquisition notification.

Further, in the multi-hop communication method according to the embodiment, if a plurality of the communication routes is available, a communication route, which has the smallest number of hops between the radio station and the radio control station 1 is selected.

Figure 13:
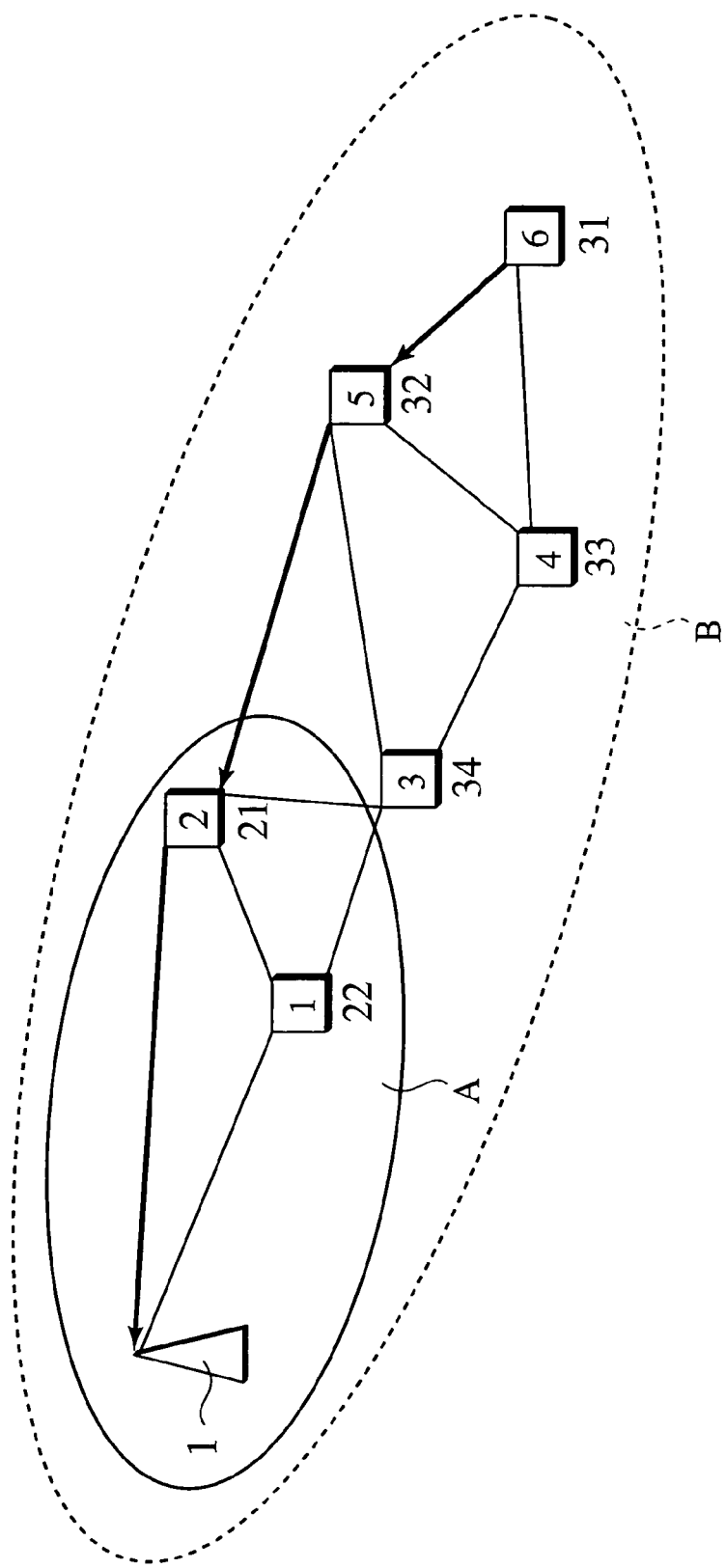
FIG. 13 is a diagram explaining an operation of the multi-hop communication system to select a communication route, which has the smallest number of hops.

FIG. 13 is a diagram explaining an operation of the multi-hop communication system to select a communication route, which has the smallest number of hops.

In FIG. 13, the case where the radio station 31 commences communication with the radio control station 1 (i.e., the core network) is illustrated.

Further, the numbers in the rectangle is correlated with a reception level of the pilot signal transmitted by the radio control station 1. The number means that the reception level is higher as the number decreases. For example, "1" shown in the rectangle of the radio station 22 means the highest reception level in the radio stations 21, 22, 31-33.

Since the information signal cannot directly be transmitted between the radio station 31 and the radio control station 1, the radio station 31 transmits a relay control signal for requesting a relay of the information signal to the other radio stations.

Here, it is assumed that the radio stations 32 and 33 received the relay control signal transmitted by the radio station 31. It is further assumed that the information signal cannot directly be transmitted between the radio station 32, 33 and the radio control station 1.

The radio stations 32 and 33 add the station ID, etc. (e.g. reception level of the pilot signal) to the relay control signal and transmits the relay control signal as a response relay control signal that the station ID, etc. is added.

In this case, the radio station 32 receives the response relay control signal from the radio station 33. Similarly, the radio station 33 receives the response relay control signal from the radio station 32. Here, since the reception level of the pilot signal is added to the response relay control signal, the response relay control signal transmitted by the radio station 33 is discarded in the radio station 32 based on the reception level.

In other words, since the number correlated to the reception level is "4" in the radio station 33, and it is "5" in the radio station 32, the radio station 32 discards the response relay control signal transmitted by the radio station 33.

Similarly, the response relay control signals transmitted by the radio station 32 and the radio station 33 are also discarded in the radio station 31.

As heretofore described, the response relay control signal is only relayed to the radio stations, which has a higher reception level. Therefore, the response relay control signal reaches the radio stations 21 and 22, which can directly relay the information signal to the radio control station 1.

The radio stations 21 and 22 transmit a response relay control signal for notifying that a relay of the information signal is possible to the radio station 31.

Under the configuration shown in FIG. 13, the following communication routes can be set (the number below means either radio station or radio control station).

(1) 31-33-34-22-1
(2) 31-33-34-21-1
(3) 31-32-33-34-22-1
(4) 31-32-34-22-1
(5) 31-32-34-21-1
(6) 31-32-21-1

The radio station 31 selects the communication route (6) which has the smallest number of hops (i.e., 3 hops).

In FIG. 13, four communication routes ((3)-(6)) exist between the radio station 32 and the radio control station 1. The radio station 32 notifies only the communication route (6), which has the smallest number of hops, to the radio station 31.

Accordingly, only three communication routes (i.e., (1) (2) and (6)) are notified to the radio station 31. This alleviates a load of selection of the communication route in the radio station 31.

Further, as shown in FIG. 12, the radio control station 1 may notify the communication route acquisition notification of all the radio stations located on the communication route. In this method, the response relay control signal including the information of the radio station relayed the response relay control signal is also received by the radio control station 1.

The radio control station 1 selects the communication route (6) as a communication route to the radio station 31 based on the response relay control signal received.

In the embodiment heretofore described, the communication route is determined according to the relay control signal transmitted by the radio station commencing communication. However, in the certain situation, e.g., an incoming call to a cellular phone (or mobile terminal) and delivery of e-mail to a cellular phone, the radio control station 1 has to transmit the relay control signal to the radio station.

In this case, the radio control station 1 can transmit a communication route acquisition request for requesting acquisition of a communication route, and the radio station can discover a communication route between the destination radio station and the radio control station 1 according to the communication route acquisition request.

Further, the radio control station 1 determines the communication route discovered by the radio station as a communication route between the between the destination radio station and the radio control station 1.

As heretofore described, according to the multi-hop communication system, the radio control station 1, the radio stations (radio stations 21, 22, 31-33) and a multi-hop communication method, it is feasible that acquisition of an appropriate communication routes between the radio stations or between the radio station and the radio control station with small amount of control signals.

Further, according to the embodiments described above, since the radio station transmits the usage inquiry to check whether or not a vacant communication channel is available before it commences communication, transmission of the information signal while no vacant communication channel is available is prevented. Therefore, communication can be conducted more surely in the multi-hop communication system even large amount of traffic occurs in the multi-hop communication system.

Moreover, according to the embodiments described above, since the radio station, of which distance to the radio control station 1 is shorter, is selected based on a reception level of the pilot signal, the communication route between the radio station and the radio control station 1, which has the minimum number of hops, can be set.

The invention has been described in detail by referring to the embodiments. It is obvious to those skilled in the art that the invention is not restricted to the embodiments described above. The invention may be carried out as a corrected or modified embodiment not departing from the gist and scope specified by the scope of the claims of a patent. Therefore, the description of this specification aims at the representation of examples but does not have any limitation on the present invention.

What is claimed is:

1. A radio station, comprising:
   a control signal reception unit configured to receive a control signal, broadcast from a radio control station, for communication connection with the radio control station;
   a reception level measuring unit configured to measure a reception level of the control signal broadcast from the radio control station, at the radio station;
   a relay controlling unit configured to receive a relay control signal to which a reception level of the control signal at an other radio station is added, the relay control signal being transmitted from a source radio station to the radio control station so as to set a communication route from the source radio station to the radio control station via at least one radio station; and
   an information signal transmission/reception unit configured to relay an information signal, which is different from the control signal, to an other radio station according to the communication route in which the relay control signal is relayed, wherein
   when the reception level added to the relay control signal is smaller than the reception level at the radio station, the relay controlling unit adds the reception level at the radio station to the received relay control signal, and relays the relay control signal, to which the reception level at the radio station is added, to other neighboring radio stations;
   when the radio station is a source of the information signal, the information signal transmission/reception unit transmits the information signal according to the communication route notified by a response relay control signal which is transmitted by a direct radio station capable of transmitting the information signal to the radio control station directly; and
   the response relay control signal is transmitted by the direct radio station in response to receiving the relay control signal at the direct radio station.

2. The radio station according to claim 1, further comprising:
   a decision unit configured to decide whether or not communication is directly conducted with the radio control station based on a reception level of the control signal received by the control signal reception unit.

3. The radio station according to claim 2, wherein the decision unit changes a threshold for the reception level according to a transmission speed of the information signal and decides whether or not communication is directly conducted with the radio control station based on a result of comparison of the reception level and the threshold.

4. The radio station according to claim 1, further comprising:
   a communication route selector configured to select an optimal communication route satisfying a prescribed condition regarding a communication state if a plurality of response relay control signals indicating different communication routes respectively are transmitted from the direct radio station.

5. The radio station according to claim 4, wherein an information indicating a number of hops from the source radio station to the radio control station is included in the response relay control signal, and the communication route selector selects the optimal communication route based on the number of hops included in the response relay control signal.

6. The radio station according to claim 4, wherein an information indicating an interference level is included in the response relay control signal, and the communication route selector selects the optimal communication route based on the interference level included in the response relay control signal.

7. The radio station according to claim 4, wherein information indicating a required transmission power is included in the response relay control signal, and the communication route selector selects the optimal communication route based on the required transmission power included in the response relay control signal.

8. The radio station of claim 4, wherein the communication route selector is configured to determine the optimal communication route for the information signal, which minimizes a total transmission power of radio stations relaying the information signal.

9. The radio station of claim 4, wherein the communication route selector is configured to determine the optimal communication route for the information signal by selecting a radio station having a smallest relative transmission power.

10. The radio station of claim 4, wherein the communication route selector is configured to determine the optimal communication route for the information signal to maximize a signal-to-interference ratio while minimizing a number of hops in the communication route.

11. A multi-hop communication system configured by a radio control station and a plurality of radio stations, wherein, one radio station included in the plurality of the radio stations comprises:
- a control signal reception unit configured to receive a control signal, broadcast from the radio control station, for communication connection with the radio control station;
- a reception level measuring unit configured to measure a reception level of the control signal broadcast from the radio control station, at the one radio station;
- a relay controlling unit configured to receive a relay control signal to which a reception level of the control signal at an other radio station is added, the relay control signal being transmitted from a source radio station to the radio control station so as to set a communication route from the source radio station to the radio control station via at least one radio station; and
- an information signal transmission/reception unit configured to relay an information signal, which is different from the control signal, to an other radio station according to the communication route in which the relay control signal is relayed, wherein
- when the reception level added to the relay control signal is smaller than the reception level at the one radio station, the relay controlling unit adds the reception level at the one radio station to the received relay control signal, and relays the relay control signal, to which the reception level at the one radio station is added, to other neighboring radio stations;
- a direct radio station which can transmit the information signal to the radio control station directly, among the plurality of the radio stations, transmits a response relay control signal notifying the communication route in which the relay control signal is relayed, in response to receiving the relay control signal; and
- the source radio station, which is a source of the information signal, transmits the information signal according to the route notified by the response relay control signal.

12. A multi-hop communication method for a radio control station and a plurality of radio stations comprising:
- receiving, by one radio station of the plurality of radio stations, a control signal, broadcast from the radio control station, for communication connection with the radio control station;
- measuring a reception level of the control signal broadcast from the radio control station at the one radio station;
- receiving a relay control signal to which a reception level of the control signal at an other radio station is added, the relay control signal being transmitted from a source radio station to the radio control station so as to set a communication route from the source radio station to the radio control station via at least one radio station;
- comparing, at the one radio station, the reception level added to the relay control signal with the reception level of the one radio station;
- adding the reception level at the one radio station to the received relay control signal, and relaying the relay control signal, to which the reception level at the one radio station is added, to other neighboring radio stations, when the reception level added to the relay control signal is smaller than the reception level of the one radio station;
- transmitting, at a direct radio station which can transmit the information signal different from the control signal to the radio control station directly, a response relay control signal notifying the communication route in which the relay control signal is relayed, in response to receiving of the relay control signal;
- transmitting, at a source radio station which is a source of the information signal, the information signal according to the communication route notified by the response relay control signal; and
- relaying the information signal to an other radio station according to the communication route notified by the response relay control signal.

\* \* \* \* \*